United States Patent

Albani et al.

[11] 4,198,682
[45] Apr. 15, 1980

[54] SYMPTOM COMPRESSION DEVICE

[75] Inventors: Alfonso Albani, Bollate; Ermanno Maccario, Pregnana Milanese, both of Italy

[73] Assignee: Honeywell Information Systems Italia, Milan, Italy

[21] Appl. No.: 863,463

[22] Filed: Dec. 22, 1977

[30] Foreign Application Priority Data

Dec. 31, 1976 [IT] Italy .................... 31040 A/76

[51] Int. Cl.$^2$ .............................................. G06F 5/00
[52] U.S. Cl. ........................... 364/900; 340/347 DD
[58] Field of Search ................. 235/302.1; 328/37; 307/216; 364/200 MS File, 900 MS File, 200, 900; 340/347 DD

[56] References Cited

U.S. PATENT DOCUMENTS

| | | | |
|---|---|---|---|
| 3,024,444 | 3/1962 | Barry et al. | 328/37 |
| 3,370,274 | 2/1968 | Kettley et al. | 364/200 |
| 3,598,979 | 8/1971 | Moreau | 328/37 |
| 3,742,459 | 6/1973 | Looschen | 364/200 |
| 3,771,136 | 11/1973 | Heneghan et al. | 364/200 |
| 3,772,654 | 11/1973 | Evans et al. | 364/200 |
| 3,780,277 | 12/1973 | Armstrong et al. | 235/302.1 |
| 3,875,344 | 4/1975 | Bogart | 340/347 DD |
| 3,989,894 | 11/1976 | Charnansol | 364/900 |
| 4,021,782 | 5/1977 | Hoerning | 364/900 |

OTHER PUBLICATIONS

"Machine Aids for Logic Design Verification, Fault Detection and Fault Isolation", Smith and Chappell, IEEE Computer Conference, 23 Sep. 71.
"A Deductive Method for Simulating Faults in Logic Circuits", Armstrong, Bell Telephone Laboratories, May 71.

Primary Examiner—Gareth D. Shaw
Assistant Examiner—E. Chan

[57] ABSTRACT

A symptom compression device receives binary coded information including bits signifying symptoms present in the course of each operating cycle at selected points in an integrated logical network, microprocessor or the like. The device includes a first register, a second shift register, an EXCLUSIVE OR logic network, and a display. The binary coded information is received on parallel inputs of the first register and applied from parallel outputs of the first register to a set of inputs of the EXCLUSIVE OR network, a second set of inputs which is connected to at least some parallel outputs from the second shift register. A set of outputs from the EXCLUSIVE OR network is connected to parallel inputs of the second shift register. In each cycle, the bits in the second shift register, which accumulate information representative of symptoms, are shifted in one direction and are recirculated. The display is connected to the parallel outputs from the second shift register. In a second embodiment, a third shift register receives the output from the EXCLUSIVE OR network. A multiplexor selectively applies signals from the outputs of the second or third shift register to the second set of inputs. The bits in the third shift register, which also accumulate information as to symptoms, are shifted in the opposite direction. A second display is connected to the outputs of the third shift register.

7 Claims, 4 Drawing Figures

SYMPTOM COMPRESSION DEVICE

BACKGROUND OF THE INVENTION

The present invention relates in general to new and improved symptom compression devices and in particular to a symptom compression device for diagnosing integrated logical networks, microprocessors and the like.

Large-scale integration circuits such as microprocessors and similar devices are well known in the art today and are finding wide utilization in digital data handling systems and apparatus. Problems arise with respect to the checking of such logical circuits to assure that they operate correctly. Many of these problems stem from the complexity and difficulty of carrying out such an operation, conditioned by the complexity of the circuit under test.

Early in the development of the art, computers were built using discrete components. These components, consisting of diodes, transistors, capacitors, and resistors, were electrically connected into relatively simple electrical networks to perform elementary logical operations. The further interconnection of such networks into more complex circuits, including complete electronic data processing systems, enabled the early user to perform complex logical functions. As a rule, these discrete components were mounted on printed circuit boards, each board containing a limited number of components and a limited number of elementary logic function networks.

In the early days of the computer, the distinction between combinatory and sequential networks was clear, e.g. between networks where the logical value at the output terminals is exclusively dependent on the value of input signals and networks where the logical value at the output terminals is further dependent on the history, or on the logical sequence of electrical circuits, through which the network has passed. For a combinatory network it is possible to check for correct operation by assuring that a predetermined combination of input signals produces a corresponding predetermined combination of output signals. Where a number of stimulations occur independently of each other in a sequential network, it is essential to know the history of the network in order to check its operation. A diagnostic operation thus requires that an ordered sequence of test stimulations be applied, starting from a predetermined initial status.

Thus, even in the early days of the computer, the checking of the correct operation of a sequential network for possible network faults presented a relatively difficult task. However, the task was simplified by the fact that discrete components, having accessible terminals both at the component level as well as the level of the printed circuit board which then contained relatively simple networks, permitted these difficulties to be overcome using relatively simple tools. Correct operation could be ascertained either by checking the individual components, or by checking the individual networks on the printed circuit board.

The subsequent use of integrated circuits of greater and greater complexity, up to the present utilization of fully integrated logical networks and microprocessors, has brought the difficulty of such an approach to the fore and has necessitated the adoption of more sophisticated test procedures which require the stimulation of the entire network input according to diagnostic programs and the monitoring of output signal patterns. The test procedures in present day use can be classified into four basic categories:

1. Computer simulation: The logical network or microprocessor to be tested is subjected to a diagnostice stimulation program. The same program is performed by a computer which simulates the circuital behaviour of the logical network and generates output signals.

Unless the output signals from the network and those from the computer during the program execution are equal, a fault is detected.

2. Comparison with a standard sample or "signature testing": The logical network or microprocessor to be tested is subjected to a diagnostic stimulation program. The same program is performed by a second logical network or microprocessor identical to the first one, but known to be good, which operates as a standard.

If the first network operates correctly, the output of the two networks must be identical during program execution.

3. "Pattern recognition testing" or comparison with a standard output pattern: The logical network to be tested is subjected to a diagnostic program and the output pattern sequence produced is compared with a standard pattern sequence corresponding to correct operation and obtained either by logical means, or by using a network identical to the one under test but known to be good and subjected to the same diagnostic program.

4. "Pattern generation" or generation of subsequent test patterns: The logical network to be tested is subjected to a diagnostic program which is not unequivocally defined from the beginning, but which changes depending on the detected output pattern.

The stimulating diagnostic program is generated by a control computer.

A fifth category can be added which may be defined as "self-diagnosis." In such a case, the logical network to be tested is inherently provided with a memory which stores a diagnostic program, and with circuit elements within the network which are capable of detecting failures of the network when the same is stimulated by the diagnostic program. A limit to the latter approach is obviously imposed by the fact that failures may affect the memory as well as the circuit elements which are to provide fault detection, thus rendering impossible or partially impossible the correct execution of the diagnostic program.

An aspect which must be considered in all of the above-discussed approaches is their applicability on the site, i.e. in the place where the network to be tested is installed. Clearly, any test generation which requires cumbersome equipment difficult to move (as is the case for instance in computer simulation), is excluded from consideration for all practical purposes. This is particularly so if the test operations can be carried out only in maintenance centers to which the apparatus to be tested must be transported.

Therefore, from a practical point of view, only those procedures which rely on self-diagnosis performed by the network to be tested itself, or by means of additional apparatus associated with the network, are of importance. This means that the fault symptoms must be identified by some element of the network itself, or by means of some external apparatus which is easy to move, such as symptoms dictionaries, correlation tables among symptoms and faults, and the like.

The self-diagnosis concept, however, does not entirely solve the problem of on-site fault detection. In fact, the common basis of test procedures, whatever they are, requires the execution of a diagnostic program and hence the control of subsequent output patterns which occur during execution of the diagnostic program. The detection of an error symptom, for instance the discrepancy between an actual output pattern and a correct output pattern corresponding to correct operation, even if indicative of a failure is not sufficient, in general, to identify the failure that occurred. Thus, it is necessary to consider a plurality of subsequent symptoms. The automatic monitoring and evaluation of such subsequent symptoms, as well as their synthesis, can be carried out automatically with the aid of a computer. However, this requires the use of costly and cumbersome equipment, which again is moved only with difficulty to different test sites. Thus, the utilization of such a technique is practical only in maintenance and support centers to which the network to be tested must be moved.

For equipment installed on site, any such monitoring is carried out by a maintenance operator and is therefore slow and subject to errors. This is due in part to the fact that the operation requires the diagnostic program to be halted at each symptom in order to enable the operator to read and examine it. Subsequently, once the symptom has been read, the program must be restarted; and finally the conceptual synthesis of the several symptoms in a single item of information is required to permit identification of the fault that occurred.

OBJECTS OF THE INVENTION

It is a primary object of the present invention to provide apparatus for monitoring the operation of large-scale integrated circuits which is not subject to the foregoing disadvantages.

It is another object of the present invention to provide simple and economical apparatus for diagnosing the operation of large-scale integrated circuits such as microprocessors or the like.

It is a further object of the present invention to provide symptom compression apparatus which has adequate characterizing power to permit the diagnosis of large-scale integrated circuits.

It is still another object of the present invention to provide apparatus for diagnosing the operation of a network in which such apparatus is adapted to compress a plurality of subsequent network symptoms appearing in subsequent patterns into a single symptoms and is capable of being either incorporated into the network under diagnosis, or of existing as an independent device.

BRIEF DESCRIPTION OF THE INVENTION

The apparatus which is the subject matter of the present invention may be embodied, for simplicity, as integral with the network to be tested, and hence as permanent test apparatus. Alternatively, and preferably, it may be embodied as an independent device, which is simple and inexpensive, readily transported and easily connected to the network under test whenever it is desired to monitor the operation of the latter and to detect any fault that may have occurred.

In accordance with the present invention, the apparatus comprises a first register for storing the significant information or symptoms containing patterns which appear at the outputs of the monitored network, or at any other suitable and accessible point of the network. A second shift register is connected in cascade to the first register through interposition of a logical network which performs a logical operation of EXCLUSIVE OR between the content of the first register and at least part of the content of the second register.

The device operates in such a way that the information contained in the first register at a certain instant, is added to the content of the second register by virtue of the EXCLUSIVE OR operation, so as to alter the information content of the second register. The latter information contents are then shifted by one bit position in the second (shift) register. When subsequently new information is loaded into the first register, this new information too is added by virtue of an EXCLUSIVE OR operation to the contents of the second register. Thus, the information so accumulated in the second register is the result of an EXCLUSIVE OR operation associated with a shift, performed on each information or symptom containing pattern sequentially loaded into the first register.

The device is controlled and timed by suitable control and timing signals generated by the logical network which is under test. The circuitry comprises, in addition, a counter for counting the accumulated symptoms containing patterns and for stopping the network under test once a preestablished number of symptoms containing patterns has been accumulated. Suitable displays enable the operator to read the contents of the second register, to examine the symptoms contained in the accumulated pattern and to identify them by comparison with a fault dictionary showing the nature and location of the fault.

These and other objects of the present invention together with the features and advantages thereof will appear more clearly from the following description of a preferred form of embodiment when read in connection with the accompanying drawings wherein like reference numerals designate corresponding parts.

DETAILED DESCRIPTION OF THE INVENTION

Figure 1:
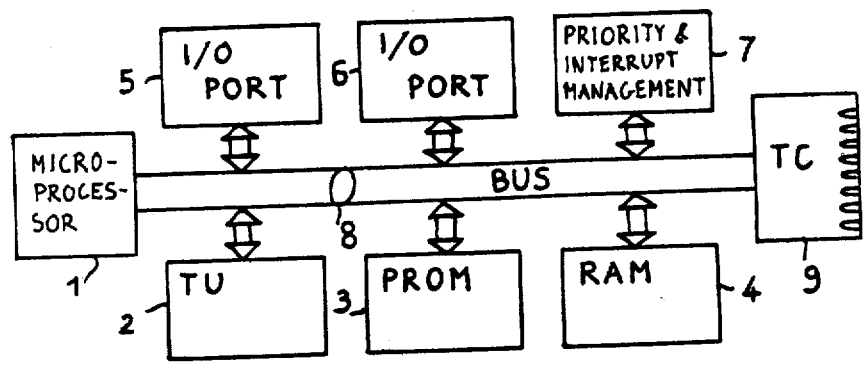
FIG. 1 illustrates a block diagram of a digital data handling system consisting of microprocessors and large-scale integrated circuitry.

In order to understand the features and the operation of the symptom compression device which forms the subject matter of the present invention, it is useful to summarily describe the structure and the organization of electronic equipment consisting of microprocessors and large-scale integrated circuitry. FIG. 1 shows, by way of example, the organization of a central processor, built-up with large-scale integrated circuits, such as miroprocessors. The central processor may include a microprocessor 1, consisting of a single circuit package or of a limited number of packages, which perform logic/arithmetic functions as well as control functions for the whole set of circuits which form the central processor.

Another integrated circuit unit 2, referred to as TU or timing unit, provides suitable timing signals for microprocessor 1 as well as for the other circuits.

A third block PROM is identified by reference 3 and consists of one or more integrated circuits. Block 3 performs the function of a programmable read only memory in which microprograms are stored. These lead the operation of the system through interpretation and execution by microprocessor 1.

A fourth block RAM is identified by reference number 4 and consists of one or more integrated circuits. Block 4 performs the function of a read/write memory, for storing therein data and programs to be respectively handled and executed by the system.

Additional blocks such as 5 and 6, designated I/O PORTS, perform interface functions with respect to external peripheral units such as printers, card reader/-punchers, disc units, magnetic tape units, etc. These blocks too may consist of a single or a limited set of packages. In case the central processor is provided with a plurality of input/output channels, e.g. a plurality of I/O PORTS, the function of assigning priorities in the acknowledgement of external interrupt requests is performed by another block 7, which too may consist of a single or a limited set of packages.

The separate blocks communicate with microprocessor 1 by means of wire set 8, in the form of a channel or bus. The organization of this channel is considered in detail below. For the moment, it should be noted that the channel, or at least part of the wires which form the channel, can be made accessible to external devices by means of a connector 9, indicated as TC (Test Connector). As such, the logical status at which such wires are set can be checked.

The structure described is exemplary not only of central processors constructed of microprocessor modules, but also of central processors built-up of circuits having a different integration level. When designing electronic systems and apparatus, the approach followed is generally to divide the system into functional blocks. These correspond to a plurality of physical (hardware) blocks interconnected by wires arranged to form one or, in some cases, a plurality of channels.

In the simplest case, each of the blocks shown in FIG. 1 consists of a single integrated circuit of the type which is commercially available, e.g. from INTEL Corporation under the codes listed in the following table:

|  |  | Code |
|---|---|---|
| Block 1: | Central Microprocessor | 8080A |
| Block 2: | Timing Unit | 8224 |
| Block 3: | Read Only Memory | 8702A |
|  |  | 8308 |
|  |  | 8316A |
| Block 4: | Read/Write Memory | 8102A-4 |
|  |  | 8107B-4 |
| Blocks 5-6: | Interface Unit | 8212 |
|  |  | 8255 |
|  |  | 8251 |
| Block 7: | Priority and Interrupt Management Unit | 8214 |

See Intel 8080—*Microcomputer System User's Manual*, published September 1975.

Figure 2:
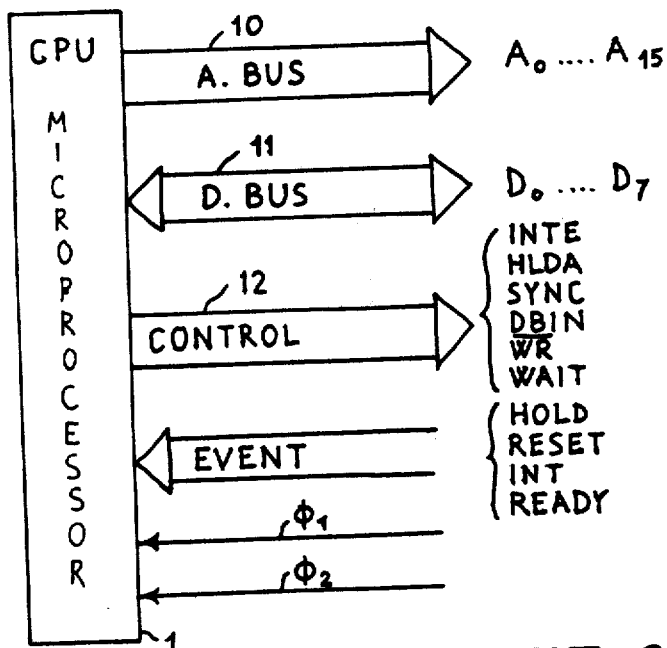
FIG. 2 illustrates the logical structure of a "bus" for transferring information among the several constituient elements of the system shown in FIG. 1.

FIG. 2 shows in greater detail the set of wires which transfer information from and to the microprocessor CPU. The wires, which are used to establish the connection with microprocessor 1, such as the INTEL 8080 microprocessor, form bus 8 in FIG. 1.

A first set of wires 10, which holds sixteen wires, respectively designated $A_0, A_1, \ldots A_{15}$, forms an Address Channel or A BUS used by microprocessor 1 to forward the address of a memory position or a peripheral unit, in binary coded form, to the other blocks or units of the system (in particular to memory units and peripheral units).

A second set of wires 11, which holds eight wires, respectively designated $D_0 \ldots D_7$, forms a Data Channel or D BUS, having bidirectional properties used by microprocessor 1 to forward to the other units or to receive from the other units, binary coded information.

A third set of wires 12, designated "Control & Timing" wires, is used by microprocessor 1 to forward to other units control and timing signals.

If the Intel 8080A microprocessor is employed for microprocessor 1, six of its wires may be used to transfer the following signals:

INTE (INTERRUPT ENABLE): Depending on its logical level, this signal indicates whether the microprocessor is in condition to accept or not to accept external interrupts.

HLDA (HOLD ACKNOWLEDGE): This signal indicates, depending on its logical level, if the microprocessor maintains control over two buses, A BUS and D BUS, or if such control is transferred to another unit. In the latter case, the microprocessor switches the pins connected to such buses to a high internal impedance state and allows another unit to take control over such buses and to apply to such buses any desired signal configuration.

SYNC: This is a pulse signal which indicates the beginning of a machine cycle.

DBIN (DATA BUS IN): This is a signal which indicates to external circuits that the microprocessor is preset to receive data from outside. It is used to enable the loading of information placed on DATA BUS into the microprocessor.

$\overline{WR}$ (WRITE): This is a signal which indicates to external circuits that the microprocessor has placed information on DATA BUS and that such information is ready to be written into memory or transferred to other units. The signal may be used as a control signal to enable a write operation into memory or the loading of information into input/output interface circuits.

WAIT: This is a signal which indicates to external circuits that the microprocessor is in a waiting state, e.g. awaiting the termination of a memory read operation in process.

Microprocessor 1 (e.g. Intel unit 8080A) further includes four input pins for connection to four input leads adapted to receive the following external signals or external events:

HOLD: This is a signal forwarded to the microprocessor which requests the microprocessor to set in its waiting state and leave control over Address bus and Data bus to an external device, for instance another microprocessor.

RESET: This is a signal which resets the microprocessor to a known initial state.

INT: This is a signal indicative of an interrupt request sent by an external device.

READY: This is a signal which indicates to the microprocessor that information received from memory or from a peripheral device is available and ready on the Data bus.

The set of wires, which are used to transfer control signals and events are designated as Control Bus. Microprocessor 8080A is further provided with two pins for receiving two cyclical timing signals $\phi_1$ and $\phi_2$. It further includes pins (not shown) for connection to suitable power sources at different voltages. The operation of a microprocessor, which is explained in detail in the aforesaid INTEL manual is similar to that of electronic data processing equipment and is performed through a plurality of "instruction cycles."

An "instruction cycle" is defined as the time required to interpret and to execute an instruction and comprises an interpreting phase, or fetching phase, and an executing phase. An "instruction cycle" comprises one or more "machine cycles," the latter being defined as the elementary unseverable time units of activity of a computer.

In the case of a microprocessor, it is preferable to define a "machine cycle" as the time interval required by the microprocessor to perform a memory access operation or access to an input/output channel. For many microprocessors, such as the INTEL 8080A, the "machine cycle" consists of a plurality of "states." With respect to such microprocessors, a "state" is the unit of unseverable activity of the microprocessor, or the interval between two basic timing pulses, for example, two successive $\phi_1$ pulses which define the timing period for the microprocessor. Pulses $\phi_2$ have the same frequency as pulses $\phi_1$ but are time-shifted relative to $\phi_1$ to provide within each "state" a suitable intermediate timing signal.

As is the case in a computer where different machine instructions are defined, so in a microprocessor different machine cycles are defined in order to perform different operations such as instruction fetching, memory read/write, input/output operations, and so on. A number of existing microprocessors, including the INTEL 8080A, characterize and identify each machine cycle by forwarding an 8 bit "status word" on the Data Bus during the first "state" of each machine cycle. This status word is accompanied by a timing signal SYNC and is loaded into a suitable register, external to the microprocessor, using the SYNC signal itself or a SYNC-derived signal as a strobe signal for loading. The status word can be used thereafter during the following states, as a source of suitable control signals.

Such control signals may characterize the address placed on the Address Bus as a memory address, a peripheral unit address, an auxiliary register address, or simply meaningless information if the machine cycle does not require any data transfer. Further the control signals may define the direction of data transfer. Without entering here into the details of the timing of the various signals, which are beyond the scope of the present invention and which can in any event be found in the above-mentioned catalogue, the following operations are significant:

A. A "status word" is loaded on the Data Bus upon the occurrence of the leading edge of timing pulse $\phi_2$, which is received within the first state of each machine cycle. The SYNC signal increases with the leading edge of pulse $\phi_2$ and decreases with the leading edge of the following $\phi_2$ pulse. Therefore, pulse $\phi_2$ is enabled by the presence of signal SYNC. Through an AND operation it may be used as a loading or "strobe" signal, either to load the "status word" in a suitable status register inside the computer system, or to load the same status word in a diagnostic device external to and connected to the system through test connector 9.

B. The output from the microprocessor in the form of binary coded information to be written into memory, or to be forwarded to a input/output peripheral unit, is maintained in the Data Bus during two or more states of a machine cycle following the first state. Specifically, the information becomes available after a certain delay relative to the leading edge of the $\phi_2$ pulse pertaining to the second state and remains stable during the whole third state, or during a plurality of states following the second one.

It ceases to be significant only following the leading edge of pulse $\phi_2$ pertaining to the state which follows the third state, or the plurality of states discussed above.

The presence of the information during subsequent states is determined by the logic level of signal READY at the input to the microprocessor. If this signal is at logical level 0, which indicates that the memory or the peripheral unit to which the information is addressed is not ready to receive the information, the microprocessor places itself in a waiting condition for one or more "states" until the information is accepted.

Another condition for the transfer of the information requires signal WR, at the output of the microprocessor, be at logical level 1, i.e. that it be present. Therefore the leading edge of signal READY, enabled by signal WR through a logical AND operation, may be used as a loading or "strobe" signal, either to load the information at the output from microprocessor into a memory position; to transfer it to a peripheral unit; or to load it through test connector 9 into a diagnostic device external to and connected to the system through the test connector 9.

C. When binary coded information is to be read by the microprocessor, i.e. when it is applied to the input of the latter, the microprocessor, besides addressing the memory of the specific peripheral unit, generates signal DBIN. The latter increases with the leading edge of the $\phi_2$ pulse pertaining to the second "state" of a machine cycle and decreases following a certain number of "states" only after a READY signal has been forwarded to the microprocessor to indicate that the requested information is available to the Data Bus. Therefore, the leading edge of signal READY, enabled by the presence of signal DBIN through a logical AND operation, may be used as a loading or "strobe" signal either to load the input data into a suitable register of the microprocessor, or to load the data through test connector 9.

D. Data exchange in input to or output from the microprocessor is carried out by means of an addressing operation effected by the microprocessor, by placing on the Address Channel the address of the memory position or the peripheral unit where the data is to be written or from which it is to be read out. Such address is generated in the first "state" of each machine cycle, together with the status word, and is maintained on the address channel for the whole machine cycle. Thus, it is present when the data to be read or written, which has been placed on the Data Bus, is effectively read out or written.

Therefore, even in the latter case the leading edge of signal READY, enabled selectively by the presence of signal WR or DBIN, may be used as a loading or "strobe" signal to load the address present on the address channel into diagnostic devices external to the system and connected to the latter through test connector 9.

From the foregoing explanation it will be clear that in the course of execution of a program which has been written for diagnostic purposes, the symptoms containing patterns which may be considered at each machine cycle are as follows:

A. Addresses present on the Address Bus.
B. Data present on the Data Bus, either at the input or the output of the data processor.
C. "Status word" which defines each machine cycle (whenever the microprocessor is organized to generate such "status word").

Such patterns may be easily strobed by means of a limited number of timing signals generated by the system itself, such as for instance those discussed above. Additionally, certain signals present on the control channel may be used in the diagnostic device to perform suitable control functions.

Figure 3:
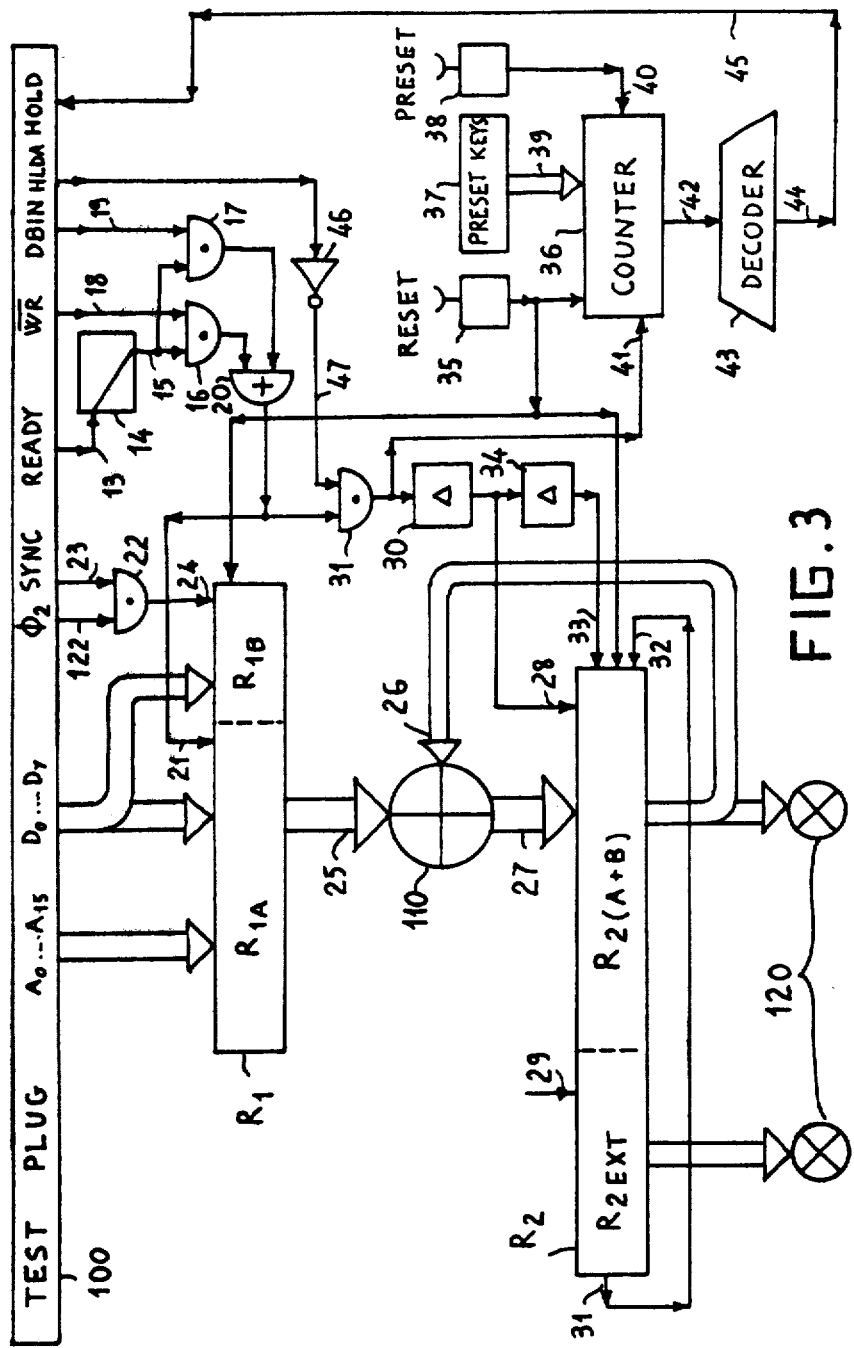
FIG. 3 illustrates a preferred embodiment of a symptom compression device for diagnosing logical integrated circuit networks such as shown in FIG. 1.

FIG. 3 shows in block diagram form a preferred embodiment of a diagnostic device in accordance with the present invention. The diagnostic device is seen to comprise a plug 100 or TEST PLUG to be connected to the TEST CONNECTOR of the system to be tested, a register $R_1$ to store therein information (or symptoms containing patterns) read out from the system to be tested through test connector 9 and test plug 100, a shift register $R_2$, a logical network 110 for performing an EXCLUSIVE OR operation, a set of displays 20 and an auxiliary element which will be discussed below.

Register $R_1$ comprises a first section $R_{1A}$, with a storage size of $16+8$ bits, which has its inputs connected to the pins of test plug 100, corresponding to Address Bus $A_{0-15}$ and to the Data Bus $D_{0-7}$. Register $R_1$ further includes a second section $R_{1B}$, with a storage size of 8 bits which has its inputs connected to the pins of test plug 100 corresponding to Data Bus $D_{0-7}$.

The two sections of register $R_1$ are loaded with information present on their respective inputs upon the occurrence of two different timing pulses. Section $R_{1A}$ is loaded upon the occurrence of a timing pulse obtained from the leading edge of signal READY. The latter signal is received from the system through test plug 100 on lead 13 and is applied to the input of a univibrator 14. Univibrator 14 is triggered by the leading edge of signal READY and generates a short positive pulse on output lead 15. This pulse is applied to one of the two inputs of AND gates 16 and 17.

AND gate 16 has its second input connected to lead 18 which receives signal $\overline{WR}$ through test plug 100. AND gate 17 has its second input connected to lead 19 which receives signal DBIN through test plug 100.

The output of AND gates 16 and 17 are connected to the inputs of an OR gate 20 whose output is connected to the timing, or strobe, input 21 of section $R_{1A}$ of register $R_1$. Therefore a pulse generated by univibrator 14 enables the loading of register $R_{1A}$ when one of the two conditions expressed by the presence of signals $\overline{WR}$ or DBIN is true. This occurs at a time immediately following the occurrence of the leading edge of signal READY. Accordingly, section $R_{1A}$ stores in its cells the address present on the Address Bus and the data present on the Data Bus, regardless of whether it is input or output data.

Section $R_{1B}$ is loaded upon the occurrence of timing pulse $\phi_2$ which is received through test plug 100 on lead 122 and is applied to an input of logical AND gate 22. The second input of AND gate 22 receives signal SYNC, through test plug 100 and lead 23. The output of AND gate 22 is connected to the timing or strobe input 24 or section $R_{1B}$. Accordingly, as already explained, at the beginning of each machine cycle the "status word" present on the Data bus is loaded into section $R_{1B}$. This operation is performed within each machine cycle before the loading of section $R_{1A}$.

The outputs of register $R_1$, which number $16+8+8$, are connected to a set of input terminals 25, equal in number, of a network 110. This network is provided with a second set of input terminals 26 corresponding in number to those of the first set. Network 110 performs a logical EXCLUSIVE OR operation with respect to the signal applied to each input of the first set and the signal applied to a corresponding input of the second set.

The output set 27 of network 110 has the same number of leads as the input set, each lead being connected to a corresponding input of shift register $R_2$.

Register $R_2$ comprises two sections: $R_2$ (A+B) and $R_2$ $_{EXT}$. Section $R_2$ (A+B) has a storage size equal to that of register $R_1$. Section $R_2$ $_{EXT}$ is a suitable extension whose storage size can be chosen depending on the desired degree of symptom compression. As will become apparent from the following description, the diagnostic device compacts a sequence of symptoms containing patterns, each having a length in bits equal to the storage size of $R_1$, into a single pattern having a length in bits equal to the storage size of $R_2$ and containing the symptoms occurring in the sequence of patterns. In this sense, a symptom compression into a single pattern is performed.

The greater the storage capacity of $R_2$ $_{EXT}$, the smaller is the symptom compression and, obviously, the greater is the cost of the diagnostic equipment. In a practical embodiment of the invention, the preferred capacity of $R_2$ $_{EXT}$ is equal to that of section $R_2$ (A+B). The outputs 27 of network 110 are connected to parallel inputs of section $R_2$ (A+B). The parallel inputs of section $R_2$ $_{EXT}$ remain unused.

The parallel loading of section $R_2$ (A+B) is performed by means of a timing or strobe pulse applied to timing input 28. The corresponding input 29 for parallel loading of section $R_2$ $_{EXT}$ remains unused.

The timing pulse for the parallel loading of section $R_2$ (A+B) is the same as the output from OR gate 20 which is used for the partial loading of register $R_1$. However, in order to keep in account the propagation delay introduced by register $R_1$ and by network 110, it is necessary that this timing pulse be adequately delayed. To this end, the output of OR gate 20 is connected to one input of AND gate 31, whose output is connected to the input of a delay element 30. The delay element may consist of a delay line or an equivalent device, such as for instance logical elements connected in series and having an intrinsic propagation delay.

The output of delay element 30 is connected to timing input 28. Register $R_2$ in general is arranged to operate as a shift register, for instance as a left shift register. For this purpose register $R_2$ has a shift output 31 and a shift input 32 and a shift timing input 33 which controls the shift operation.

Internal to the registers, each memory cell is connected in series so that following a shift operation the contents of each cell of generic order n is shifted into the cell of order n+1. The contents of the higher order cell are transferred out of the register through output 31 and is reintroduced into the lower order cells of the register through input 32.

In order to assure that the shift operation occurs when data loaded through the parallel input is stored in a stable manner, the shift command is obtained by connecting the output of delay element 30 to the input of a second delay element 34, and by connecting the output of element 34 to the clock input 33. The parallel outputs of shift register $R_2$ are connected to display elements 120, such as for example light emitting diodes, one for each cell of the register. The on/off status of each such diode then displays the logical status "1" or "0" of the information stored in each cell. The parallel outputs of section $R_2$ (A+B) are connected to the inputs 26 of logical network 110 which performs a logical EXCLUSIVE OR operation between the information present on such inputs and that present on inputs 25.

The diagnostic device which forms the subject matter of the present invention further includes auxiliary devices for the purpose of initializing, presetting, and stopping the operation of the diagnostic device. A RESET push button 35 provides a manual command for resetting the contents of registers $R_1$ and $R_2$ to logical level 0 so as to start a diagnostic test procedure beginning from an initial state which is known. If preferred, the same RESET signal may be provided to the two registers through plug 100. In such a case, the same RESET signal is used which is generated internally in the system under test.

A counter 36 provides a count of the number of machine cycles which have elapsed and hence of the number of loading operations which have been performed by the diagnostic device. The counter also serves to stop the operation of the diagnostic device after a predetermined number of machine cycles have occurred. To the latter end a set of console keys 37 is provided as part of the diagnostic device and the outputs 39 of keys 37 are connected to the parallel input of counter 36. A PRESET button 38 is connected to the present input 40 of counter 36.

By suitable manual setting of the keys and by enabling the parallel loading of the computer through the activation of PRESET button 38, counter 36 is preset to any desired state corresponding to a selected number of cycles, expressed in a binary code. The timing or clock input 41 of counter 36 is connected to the output of AND gate 31 so that at each loading control pulse received by register $R_2$, counter 36 also received a clock pulse.

While in the example under consideration counter 36 is used as a count-down counter, it is well known that electronic counters may be used as count-up or count-down counters. The outputs of counter 36 are connected to the inputs of a decoding network 43 which detects the point when the contents of the counter read 0 and generates a stop command to its output 44. This command is coupled to the system through lead 45, test plug 100, and test connector 9. It is received on the lead of the control bus used to transfer the HOLD signal, thus stopping the operation of the system.

As stated above, in the system described the HOLD signal can be generated by system elements other than the microprocessor. When this occurs, the microprocessor leaves control of the Address Bus and Data Bus to other apparatus forming part of the system and generates a signal HLDA. Thus, the system has the additional capability of stopping the operation of the diagnostic apparatus independently of the zeroing of counter 36.

The HLDA signal is sent through test connector 9 and test plug 100 to the input of inverter 46. The output of the latter is connected to the second input of AND gate 31 through wire 47. In this way, when signal HLDA is high, AND gate 31 is inhibited and any loading or shifting operation of register $R_2$ is prevented. This feature is useful to prevent apparatus of the system under test, other than the microprocessor, from continuing to activate the diagnostic device by the generation of a READY signal in the presence of $\overline{WR}$ or DBIN. It will be understood that this feature is exemplary only of the broader concept that the operation of the diagnostic apparatus may be stopped whenever a pre-established event or condition occurs inside the system under test.

The operation of the diagnostic device for providing symptom compression for diagnostic testing is as follows. For the sake of simplicity it is assumed that the length of register $R_1$ is 10 bits and the length of register $R_2$ is 20 bits. The system under test is stimulated by the execution of a diagnostic program. Such a program will be organized according to suitable criteria, so that determined areas of the system will be subjected to some operation in an ordered and selective manner.

Let it be assumed that in the course of the first machine cycle the information contained in the system busses is represented by the following binary code:

1st cycle $R_1$ 1001011001.

The fourth order bit which is 1 is underlined to indicate that it is incorrect and that it must be 0 for a correct response to the system. Thus, this bit provides an error symptom, and the 1st cycle code is loaded into register $R_1$. Register $R_2$, which was reset at the outset, contains a code configuration of all 0's. The EXCLUSIVE OR operation performed with respect to the contents of register $R_1$ and the contents of register $R_2$, bit by bit, provides the following binary code in register $R_2$ during the first cycle:

1st cycle $R_2 \oplus$ 00000000001001011001.

The SHIFT operation, performed on the contents of register $R_2$ in the first cycle, provides the following binary code in register $R_2$:

1st cycle $R_2$ SHIFT 00000000010010110010.

It can be seen that the error symptom is now shifted into the fifth order bit position.

Let it be assumed now that in the course of the second machine cycle the information contained in the system busses is represented by the following binary code, where once again the fourth order bit, twice underlined, is incorrect, i.e. it is 0 rather than 1. Thus, another error symptom is provided:

2nd cycle $R_1$ 1100100011.

This code is loaded into register $R_1$, while register $R_2$ contains the configuration discussed above.

The EXCLUSIVE OR operation performed between the contents of the two registers $R_1$ and $R_2$, bit by bit, loads the following code into register $R_2$ during the second cycle:

2nd cycle $R_2 \oplus$ 0000000011110010001.

The SHIFT operation performed on the contents of register $R_2$ in the second cycle provides the following binary code in register $R_2$:

2nd cycle $R_2$ SHIFT 00000001111011100010.

This code contains as error symptoms two bits, i.e. of the 5th order and of the 6th order respectively. Thus, the system has accumulated two error symptoms at this time.

The above described accumulation operation may proceed indefinitely. Any error symptom which is finally located in the 20th order bit position is not lost however. This is due to the subsequent SHIFT operation, by which such error symptom is reentered in the 1st order bit position.

There are only two cases by which symptoms may be lost and both occur for pairs of symptoms:

1. If two symptoms occur in the same bit order but in different machine cycles (say in different patterns), the interval in number of cycles between the cycles in which the two symptoms occur being equal to the length of register $R_2$ (in bits), then the two symptoms overlap in the same bit position and thus cancel each other. In fact, due to the recirculation of the content of register $R_2$ for its whole length, the first symptom, with the occurrence of the cycle in which the second symptom appears, is reentered in the original position and overlaps with the second symptom. Further, the EXCLUSIVE OR operation performed on two overlapping symptoms gives a result which is the same as if the two symptoms were not present; and, in this sense, the two symptoms cancel each other.

2. If two symptoms occur in different bit order and in different machine cycles, the interval in number of cycles between the cycles in which the two symptoms occur being equal to the difference between the order of the second symptom and the order of the first symptom, augmented in case of a multiple, of the length of register $R_2$ in bits, then, once again the two symptoms overlap in the same bit position and thus cancel each other for the same reasons given above.

However, these limitations of the accumulation power of the diagnostic device are not such as to hamper the efficiency of this diagnostic tool. In addition, it is possible by means of simple modifications and additions, to compensate almost completely for the risk of symptom loss.

Figure 4:
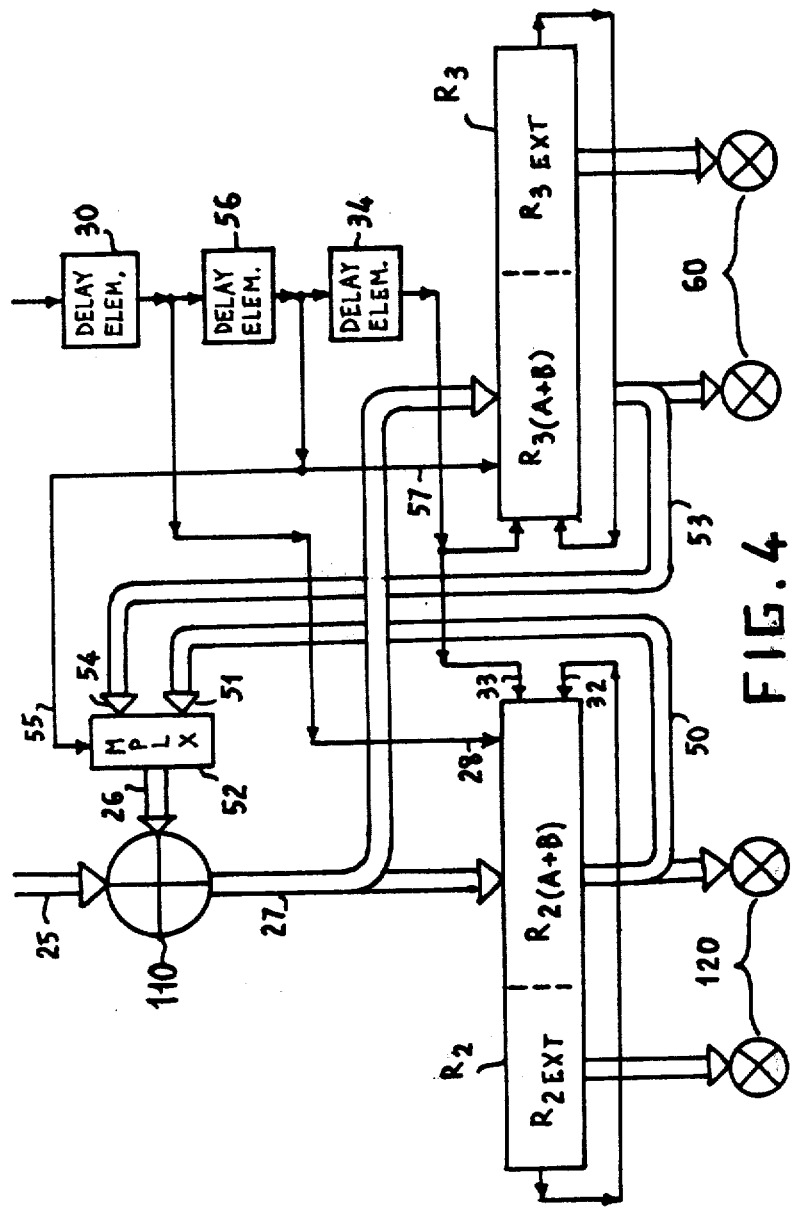
FIG. 4 illustrates another embodiment of the apparatus shown in FIG. 3.

FIG. 4 illustrates another embodiment of the diagnostic device according to the present invention. As stated above, elements common to FIG. 3 and FIG. 4 are identified by the same reference numbers. Further, all the elements of FIG. 3 which are not shown in FIG. 4 are intended to be part of the embodiment of FIG. 4, without any circuit change. The circuit of FIG. 4 uses two shift registers $R_2$ and $R_3$, as shown, $R_2$ being a left-shift register and $R_3$ being a right-shift register.

Information from the output of register $R_1$ is applied through the leads of set 25 to a first input set of logical circuit 110, which performs the EXCLUSIVE OR operation between the information received through the set of leads 25 and the information received through a second set of leads 26. The output set 27 of logical circuit 110 is connected both to the parallel inputs of section $R_2$ (A+B) of register $R_2$ and to the parallel inputs of a section $R_3$ (A+B) of register $R_3$. The latter comprises a section $R_3$ (A+B) and an additional section $R_3$ $_{EXT}$.

The parallel outputs of section $R_2$ (A+B) are connected through a set of leads 50 to a first input set 51 of a multiplexor circuit 52. The parallel outputs of section $R_3$ (A+B) are connected through a set of leads 53 to a second input set 54 of multiplexor circuit 52. The outputs of multiplexor 52 are connected to the input 26 of logical circuit 110.

The function of multiplexor 52 is to transfer the information present on inputs 51 and 54 in a mutually exclusive way to the outputs connected to inputs 26 of circuit 110. Selection occurs by means of a command signal applied to an input 55, when this signal is at logical level 0, the information on inputs 51 is transferred to leads 26. When the signal is at logical level 1, information on inputs 54 is transferred to leads 26.

The output of delay element 30, besides being connected to the parallel loading input 28 of section $R_2$ (A+B) is further connected to the input of a delay element 56 whose output is connected to input 55.

The delay of element 56 is chosen so that a pulse appears on its output when the pulse at its input is already extinguished. Therefore, section $R_2$ (A+B) is loaded when it receives a command pulse on input 28, with the binary code resulting from the EXCLUSIVE OR operation performed with respect to the binary code present on inputs 25 and the binary code on the output from section $R_2$ (A+B) and present on inputs 26. Immediately thereafter, the delayed command pulse generated by delay element 56 selects for transfer the inputs 54 of multiplexor 52. Additionally, the delayed command pulse is applied through lead 57 to the parallel loading input of section $R_3$ (A+B). Thus, section $R_3$ (A+B) receives the latter pulse with the binary code resulting from the EXCLUSIVE OR operation performed on the binary code present at input 25 and the binary code on the output of section $R_3$ (A+B).

The output of delay element 56 is further connected to the input of delay element 34, whose output is connected to the shift command inputs of both register $R_2$ and register $R_3$.

Once they have been loaded in parallel with each other, both registers are subjected to a SHIFT operation. Register $R_3$ is provided with display devices 60 connected to its outputs. By this arrangement which subjects the symptoms recorded in the two registers to a left shift or right shift respectively, the probability that the two symptoms will cancel each other due to the accumulation process is greatly reduced. In fact, the symptoms which cancel each other in one register will not, in general, cancel each other in the other register.

It is apparent then, assuming registers $R_2$ and $R_3$ have the same length, that the unique symptoms which may cancel each other are pairs of symptoms in bits of the same order which occur at a distance, in number of machine cycles, equal to the length of the two registers, expressed in numbers of bits. In case the two registers $R_2$, $R_3$ are of different length, the pairs of symptoms which may cancel each other are determined by different, readily ascertainable, conditions. In both instances, the probability that symptoms will be lost is very low.

The embodiment shown in FIG. 4 is exemplary only and modifications may be made. For example, rather than using additional delay elements relative to those considered in FIG. 3, it would be possible to use the same timing system and to perform simultaneously the EXCLUSIVE OR operation by means of two distinct logical circuits, one relative to register $R_3$. The choice of parameters is determined on a case-by-case basis, by economic criteria and eventually by the particular timing and speed requirements.

It will also be clear that rather than using a display for each bit of the register $R_2$ and for each bit of register $R_3$, it is possible to use a limited number of displays together with switching elements which connect them alternatively to the outputs of one or the other of the two registers, or to a portion of such outputs.

From the foregoing description of the apparatus for the compression and memorization of symptoms in its block structure, it will be clear that the same can be manufactured by using integrated circuits and thus using a limited number of components. For the sake of completeness of the disclosure, a list of integrated circuits using TTL technology is provided, which are capable of performing the logical functions indicated of the various blocks:

Univibrator 14: TEXAS INSTRUMENTS integrated circuit SN54121. An additional resistor external to the integrated circuit is required, whose value determines the duration of the produced pulse.

AND Gates 16, 17, 22, 31: TEXAS INSTRUMENTS integrated circuit SN 5408. A single package comprises all four gates.

OR gate 20: TEXAS INSTRUMENTS integrated circuit SN 5432. Only one OR gate, of four provided, is used.

Delay Elements 30, 34, 56: These may consist of a plurality of diodes, cascade-connected delay lines, or any other element which has an inherent propagation delay. For instance, the unused OR gates of TEXAS INSTRUMENTS circuit SN 5432 may be connected in cascade (e.g. with the output connected to the input of another OR gate, one input of each gate being permanently kept at logical level 0).

Inverter 46: TEXAS INSTRUMENTS integrated circuit SN 5404. Only one of the six inverters on this chip is used. The remaining inverters, for example, may be connected in cascade, in pairs, to be used as delay elements.

Register $R_1$: TEXAS INSTRUMENTS integrated circuit SN 54100 performs the function of an 8 bit LATCH register, where information is loaded by a positive clock pulse. Section $R_{1B}$ can be made with three of these circuits. Section $R_{1A}$ can be made with three of these circuits.

Logical Network 110: TEXAS INSTRUMENTS integrated circuit SN 5486. By using eight of such circuits a logical network of 32 logical elements is obtained which perform the EXCLUSIVE OR operation on 32 couples of input signals as required.

Registers $R_2$, $R_3$: TEXAS INSTRUMENTS integrated circuit SN 54194. By using a suitable number of such integrated circuits, shift registers of any desired length can be obtained.

Multiplexor 52: TEXAS INSTRUMENTS integrated circuit SN 54153. This circuit performs the logical function of dual selector/multiplexor 4 to 1. In other words, it consists of a couple of selectors each of which selects one input over four. It is possible to use such a circuit as a selector of one input over two, as required in the case of the exemplary embodiment described herein.

Counter 36: TEXAS INSTRUMENTS integrated circuit SN 54192. By using a suitable number of such circuits it is possible to obtain a counting capability up to any desired value.

Decoder 43: This is a circuit which must identify an output configuration of "all zeros." It may consist of a simple NAND circuit having a number of inputs equal to the number of outputs of counter 36.

TEXAS INSTRUMENTS 8 input NAND gate SN 5430 is suitable for this circuit. By using a plurality of SN 5430 circuits and connecting their outputs to the inputs of an AND gate, a decoder of any desired capacity is obtained.

It is pointed out once again that the preferred embodiments of the present invention shown in FIG. 3 and FIG. 4 and the circuits inidicated for their implementation, as well as the set of information which is memorized as a set of symptoms, are exemplary only. For example, when the system to be tested fails to make use of microprocessors which operate according to multiple subsequent "states" within each machine cycle, but works according to elementary machine cycles, the diagnostic device which forms the subject matter of the present invention is simplified because there is then no need to memorize "status words." In other cases, it will be convenient to memorize other kinds of information, for instance the information present on the control bus. Further, although the diagnostic device has been described as removably connected to the system to be tested, it will be clear that it may be integral with the system to be tested.

From the foregoing discussion it will be clear that numerous variations, modifications, and changes will now occur to those skilled in the art, all of which fall within the general scope of the present invention. Accordingly, the invention is intended to be limited only by the appended claims.

We claim:

1. A symptom compression device for compacting in an output pattern the symptoms occurring in different cycles during cyclical operation of a network on binary coded information, comprising:
   first register means including parallel outputs;
   first loading means for loading at least part of the binary coded information present in the course of each operating cycle at selected points of said network into said first register means;
   second shift register means for storing binary coded information representative of accumulations of said symptoms, said shift register means including parallel outputs;
   EXCLUSIVE OR logic means, including a first set of inputs connected to said parallel outputs of said first register means and a second set of inputs connected to at least some of said parallel outputs of said second shift register means, for effecting an EXCLUSIVE OR operation, bit by bit, with respect to said binary coded information stored in said first register means and said binary coded information stored in said second shift register means;

second loading means for loading the output from said logic means into said second shift register means;

timing means operative in each said cycle to control in sequence the operations of said first loading means, said logic means, said second loading means, and said second shift register means to provide a one bit shift operation therein; and display means connected to said parallel output of said second shift register means for displaying the contents of said second shift register means.

2. A symptom compression device in accordance with claim 1 and further comprising:

a cycle counter actuated by said timing means and having an output; and means fed by the output of said counter for halting the operation of said device once a predetermined number of cycles have been counted.

3. A symptom compression device in accordance with claim 1 and further comprising:

a plug removably adapted for connection of said first loading means and said timing means to selected circuit points of said network.

4. A symptom compression device for compacting in an output pattern the symptoms occurring in different cycles during cyclical operation of a network on binary coded information, comprising:

first register means including parallel outputs;

first loading means for loading at least part of the binary coded information present in the course of each operating cycle at selected points of said network into said first register means;

EXCLUSIVE OR logic means, including a first set of inputs connected to said parallel outputs of said first register means and a second set of inputs, and parallel outputs;

second shift register means for storing binary coded information representative of accumulations of said symptoms, said second shift register means including parallel inputs, at least some of said parallel inputs being connected to the parallel outputs of said logic means, and parallel outputs;

third shift register means including parallel inputs, at least some of said parallel inputs of said third shift register being connected to the output of said logic means, and parallel outputs, the shift direction of said third register means being opposite to that of said second shift register means;

a selector circuit having first parallel inputs connected to at least some of the parallel outputs of said second shift register means, second parallel inputs connected to at least some of the parallel outputs of said third shift register means and parallel output said selector circuit being adapted to apply on said parallel outputs of said selector circuit to said second set of inputs of said logic means, in a mutually exclusive way, the information contained in at least part of said second or said third register means;

timing means operative in each cycle to control in sequence the operations of:

(a) loading of said first register means, (b) EXCLUSIVE OR operation of said logic means with respect to information contained in said first register means and at least part of the information contained in said second register means and loading of the result of said operation into said second register means, (c) EXCLUSIVE OR operation of said logic means with respect to information contained in said first register means and at least part of the information contained in said third register means and storing of the result of said operation in said third register means, and (d) a one bit shift operation in one direction of the information stored in said second register means and a one bit shift operation in the opposite direction of the information stored in said third register means; and display means connected to said parallel output of said second shift register means for displaying the contents of said second shift register means.

5. A symptom compression device for compacting in an output pattern the symptoms occurring in different cycles during cyclical operation of a network on binary coded information, comprising:

means for receiving a binary coded signal from said network including bits signifying the symptoms present in the course of each operating cycle at selected points of said network;

first register means including parallel outputs;

means for loading said binary coded signals into said first register means;

second shift register means for storing binary coded information representative of accumulation of said symptoms, said second shift register means including parallel inputs and parallel outputs;

EXCLUSIVE OR logic means, including a first set of inputs connected to said parallel outputs from said first shift register means, a second set of inputs connected to at least some of said parallel outputs from said second shift register means, and a set of outputs connected to at least some of said parallel inputs of said second shift register means;

timing means operative in each said cycle to control in sequence the operations of said means for loading said binary coded signals into said first register means, said logic means, loading said second shift register means from said logic means, and shifting the bits stored in said second shift register means in one direction; and output means connected to said parallel outputs of said second shift register means for receiving the contents of said second shift register means.

6. A symptom compression device in accordance with claim 5, further comprising means for recirculating said bits stored in said second shift register means.

7. A symptom compression device in accordance with claim 5, further comprising third shift register means having at least some inputs connected to said set of outputs, multiplexor means for selectively applying signals from said parallel outputs of said second shift register means or from parallel outputs of said third shift register means to said second set of inputs, and second control means for shifting the bits stored in said third shift register means in a direction opposite to said one direction.

* * * * *